W. F. LOCKWOOD, B. H. SCOTT AND W. G. ROYAL.
COTTON HARVESTER.
APPLICATION FILED JUNE 12, 1920.
1,384,265.
Patented July 12, 1921.
4 SHEETS—SHEET 1.
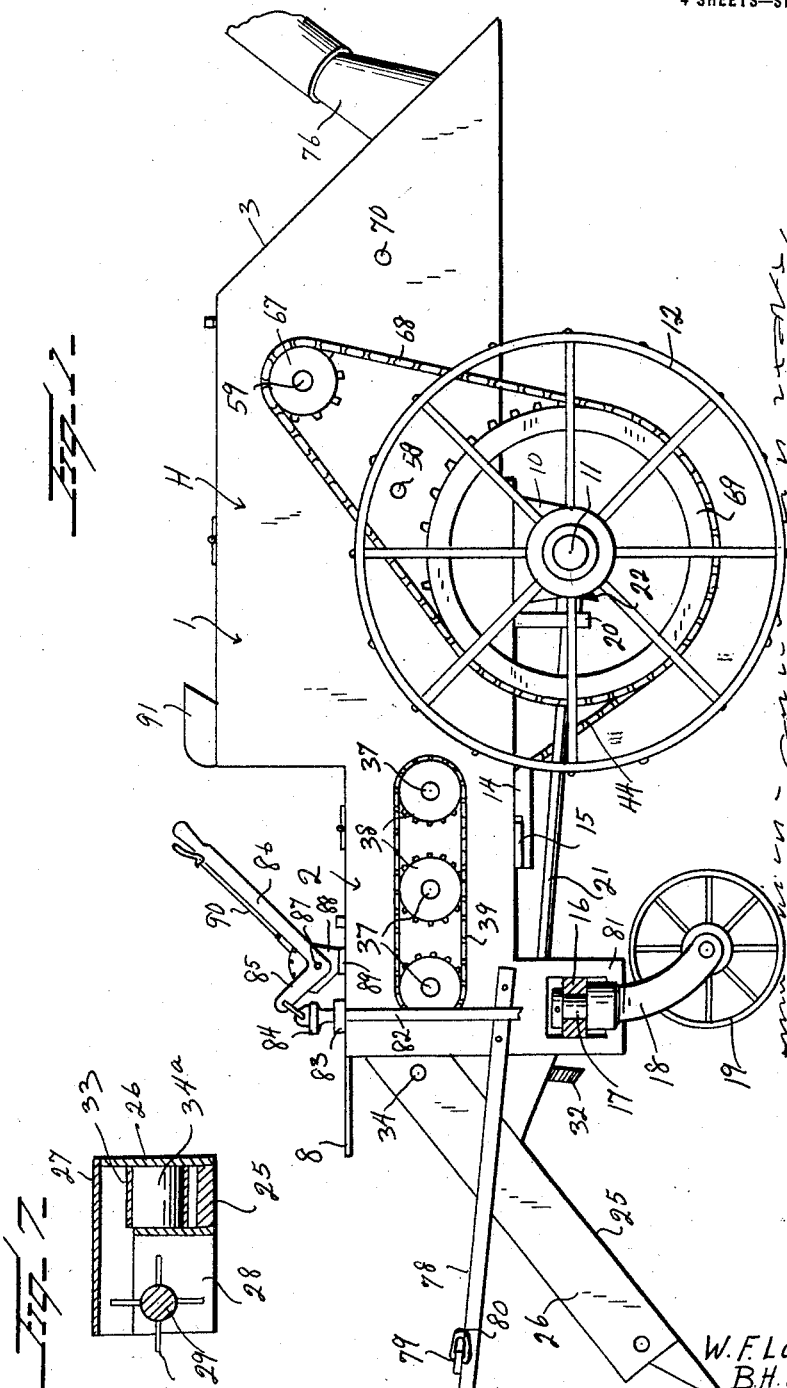
Inventors
W. F. Lockwood,
B. H. Scott and
W. G. Royal.
By Watson E. Coleman
Attorney

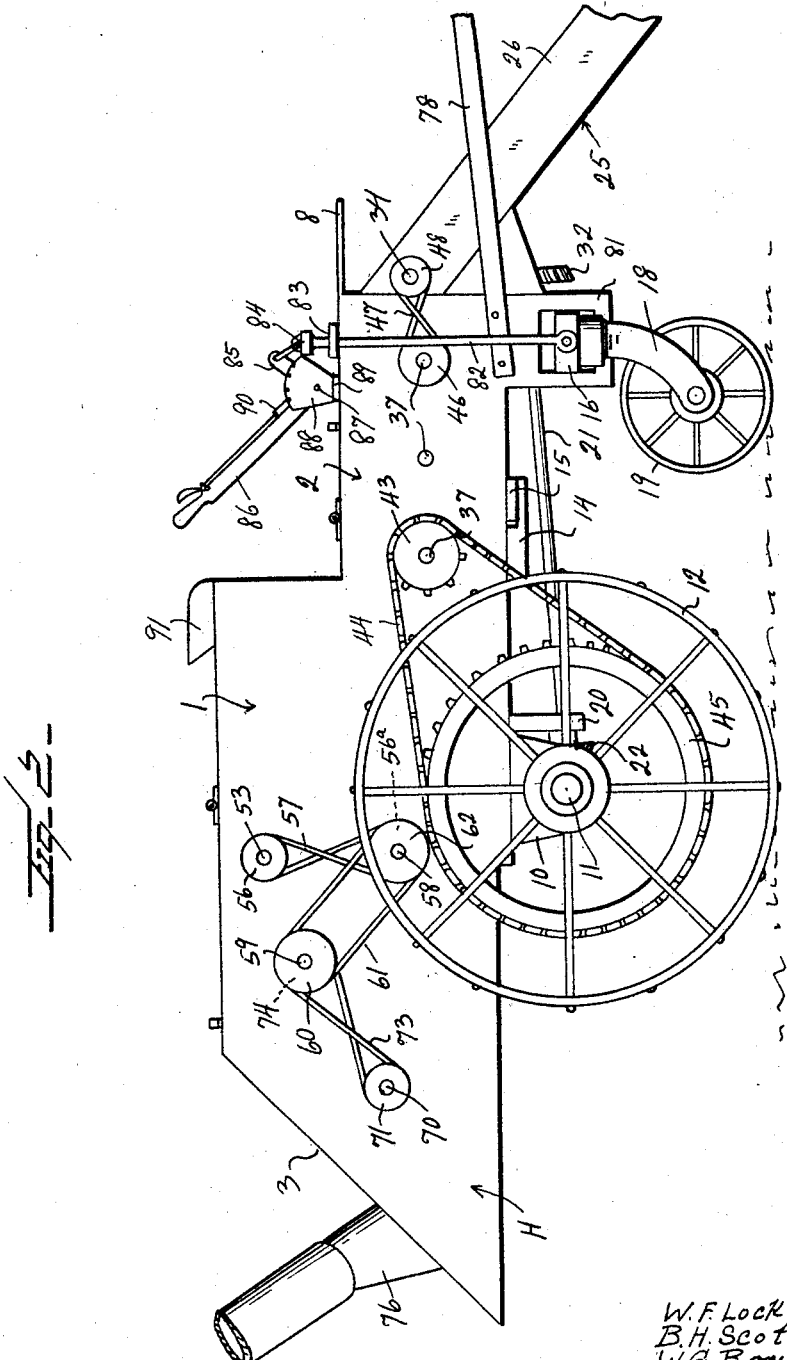

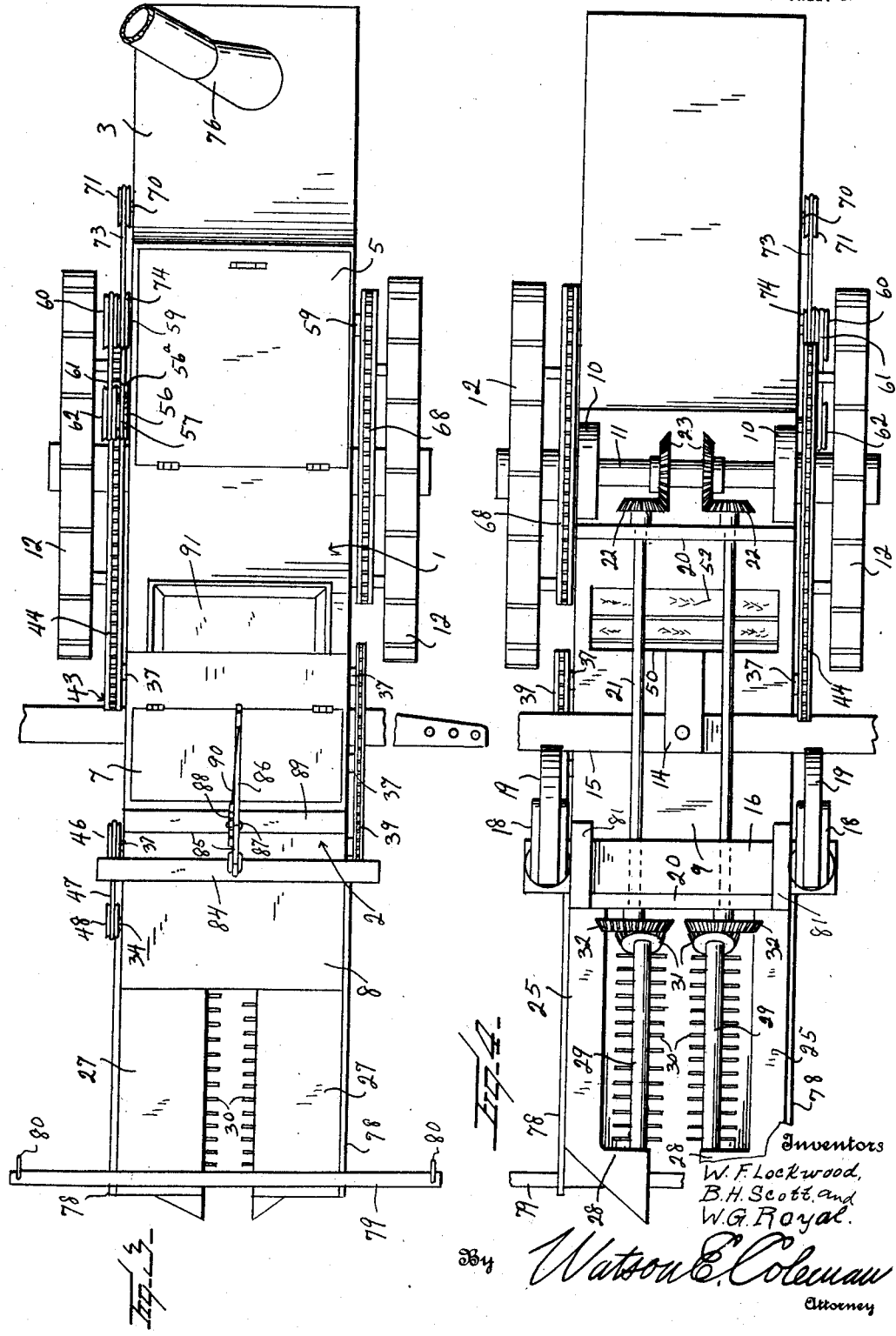

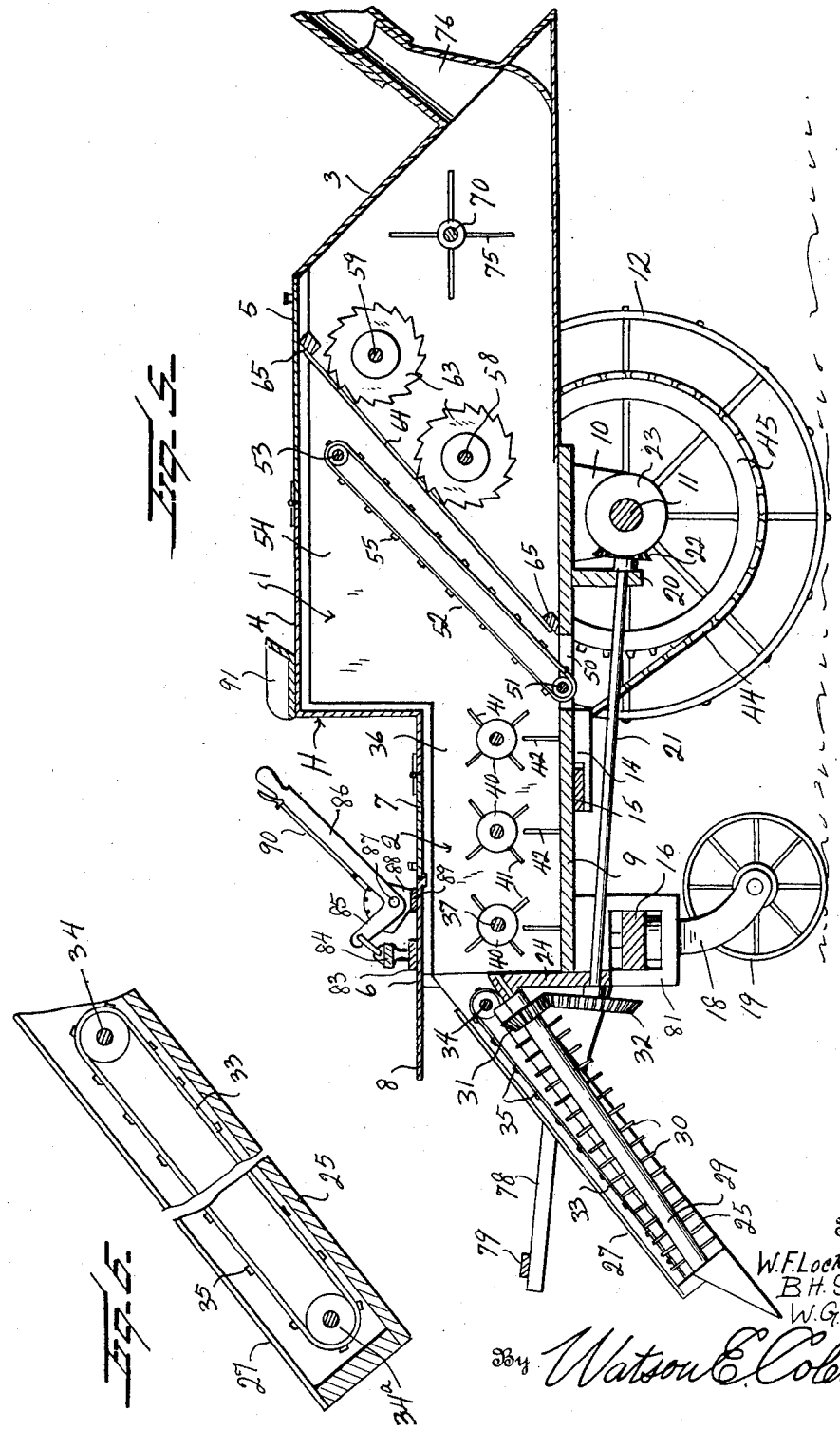

UNITED STATES PATENT OFFICE.

WILLIAM F. LOCKWOOD, BERLIE H. SCOTT, AND WILLIAM G. ROYAL, OF HOLLIS, OKLAHOMA.

COTTON-HARVESTER.

1,384,265.  Specification of Letters Patent.  Patented July 12, 1921.

Application filed June 12, 1920.  Serial No. 388,442.

*To all whom it may concern:*

Be it known that we, WILLIAM F. LOCKWOOD, BERLIE H. SCOTT, and WILLIAM G. ROYAL, citizens of the United States, residing at Hollis, in the county of Harmon and State of Oklahoma, have invented certain new and useful Improvements in Cotton-Harvesters, of which the following is a specification, reference being had to the accompanying drawings.

This invention relates to certain improvements in cotton harvesters and it is an object of the invention to provide a novel and improved device of this general character of a portable type and which is provided with means whereby cotton may be gathered directly from the standing plants.

It is also an object of the invention to provide a device of this general character wherein means are provided for separating the bolls and other foreign matter from the cotton as gathered by the machine together with means whereby the separated cotton may be delivered to a barge or other vehicle trailing the harvesting machine.

Another object of the invention is to provide a machine of this general character embodying a novel and improved separating mechanism comprising a plurality of rotating saws to which the gathered cotton is delivered, and which saws operate to separate the cotton from the bolls together with means operating to prevent the separated bolls and other foreign matter from passing out with the separated cotton.

It is also an object of the invention to provide a novel and improved machine of this general character including a gathering mechanism and a separating mechanism and wherein a braking medium is interposed between the gathering mechanism and the separating mechanism whereby the bolls are effectively crushed or broken to facilitate the requisite separation of the cotton.

The invention consists in the details of construction and in the combination and arrangement of the several parts of our improved cotton harvester whereby certain important advantages are attained and the device rendered simpler, less expensive and otherwise more convenient and advantageous for use, as will be hereinafter set forth.

The novel features of our invention will hereinafter be definitely claimed.

In order that our invention may be the better understood, we will now proceed to describe the same with reference to the accompanying drawings, wherein:

Figure 1 is a view in side elevation of a cotton harvester constructed in accordance with an embodiment of our invention, with certain of the parts broken away.

Fig. 2 is a view in side elevation opposite to that shown in Fig. 1 with certain of the parts broken away.

Fig. 3 is a view in top plan of the device as herein disclosed with certain of the parts broken away.

Fig. 4 is a view in bottom plan of the device as herein disclosed with certain of the parts broken away.

Fig. 5 is a longitudinal vertical sectional view taken through the device as herein disclosed.

Fig. 6 is a fragmentary view partly in section and partly in elevation illustrating in detail one of the conveyers comprised in the gathering mechanism, and Fig. 7 is a fragmentary transverse sectional view taken through said gathering mechanism.

As disclosed in the accompanying drawings, H denotes a housing of requisite dimensions and which has its rear portion 1 of a height greater than the forward portion 2 thereof and with its rear wall 3 disposed on a forward and downward incline. The top wall of the rear portion comprises a forward stationary portion 4 and a rear portion 5 constituting a hinged door supported for vertical movement and whereby access may be had within the interior of the rear portion 1 of the housing H as the requirements of practice may necessitate.

The top wall 6 of the forward portion 2 of the housing H also includes a vertically swinging door 7 to permit access when required within said forward portion 2 of the housing. The forward end of the housing is open and the top 6 is continued by the forwardly directed extension 8 constituting an apron for a purpose which will hereinafter be more particularly referred to.

The bottom or floor 9 of the housing H is substantially coplanar throughout its entire length and depending from said bottom or floor 9 and substantially midway thereof is a pair of transversely spaced bearings with which is rotatably engaged a transversely disposed axle 11. Mounted upon the opposite end portion of the axle 11 are the supporting wheels 12 of a conventional traction type of a relatively large diameter so that in practice the machine may readily travel over a row of cotton plants to effect the desired harvesting or gathering of cotton.

Secured to the under face of the bottom or floor 9 at a desired point in advance of the axle 11 is a bracket 14. Pivotally engaged with the bracket 14 is the central portion of the transversely disposed draft beam 15 of a length to extend a desired distance beyond the opposite sides of the machine. The opposite end portions of the draft beam 15 are adapted to have hitched thereto suitable draft rigging whereby the machine may be readily transported.

While we do not wish to be understood as limiting ourselves to any particular draft means, our machine as herein disclosed is intended to be drawn by horses or other animals, and a single animal or a team of animals as the occasions of practice may necessitate, may be hitched to each end portion of the draft bearing 15.

The forward end portion of the bottom or floor 9 is provided with a transversely disposed sill 16 extending beyond the opposite sides of the housing H and operatively engaged in a conventional manner with each extending portion of said bolster or sill is the shank 17 of the fork 18 for the caster wheel 19.

Depending from the forward portion of the floor or bottom 9 at predetermined points spaced longitudinally thereof are the transversely disposed beams 20 which rotatably support a pair of shafts 21. The shafts 21 extend longitudinally of the floor or bottom 9 of the housing H and are spaced apart transversely thereof. The inner or rear end portions of the shafts 21 are provided with the gear wheels 22 meshing with the gear wheels 23 fixed to the central portion of the axle 11 and in a manner whereby said shafts are caused to rotate in reverse directions, or inwardly from above.

The forward end of the housing H has extending across the lower part thereof a beam 24, with which is engaged the end portion with a pair of forwardly disposed and downwardly inclined members 25 arranged in parallelism and in transversely spaced relation.

The outer marginal portions and the lower end portions of each of the members 25 are provided with the upstanding boards or walls 26 and operatively supported by the marginal portions of the boards or members 26 is a top member or board 27 overlying the member 25 and extending inwardly thereof. The inner or opposite edges of the end boards or members 26 and the top members 27 are separated so that as the machine travels along a row of cotton plants, such plants may readily pass between the members 25.

The lower end portions of the members 25 are provided with inwardly disposed and perpendicularly related extensions 28 and rotatably supported by such extensions 28 and the member 24 is a pair of shafts 29 substantially in parallelism, and each of such shafts 29 has rotating therefrom the teeth 30 whereby, upon rotation of the shafts 29, the cotton is gathered or harvested from the standing plants. The upper end portion of each of the shafts 29 has fixed thereto a gear 31 meshing with a gear 32 fixed to the adjacent end portion of the shaft 21. The gear 31 is arranged above the gear 32 so that the shaft 29 will be caused to rotate outwardly from below whereby the cotton gathered or harvested by the teeth 31 will be delivered to the upper stretch of an endless carrier 33 positioned upwardly of the shaft 29.

In the present embodiment of our invention each of the conveyers 33 comprises a canvas strip or the like extending around an end portion of a transversely disposed shaft 34, rotatably supported by the upper end portions of the side members or boards 27. Said canvas strip is also disposed around an idle drum or pulley 34ª rotatably supported by an inwardly disposed extension 28 of the coacting member 25. The canvas strip is also provided with a series of longitudinally spaced and transversely disposed cleats 35.

The shaft 34 rotates in a direction to cause the upper stretches of the conveyers 33 to move upwardly so that the harvested or gathered cotton will be discharged within the forward end portion 2 of the housing H through the outer or forward open end thereof.

The apron 8 hereinbefore referred to is of such size to bridge the space between the forward end of the housing H and the upper end portions of the top members or boards 27 whereby the delivery of the harvested or gathered cotton within the housing H is assured.

Rotatably supported by the side walls 36 of the forward end portion of the housing H and extending transversely therethrough is a plurality of shafts 37 having corresponding end portions extending exteriorly of the housing H. Fixed to the extended portions of the shafts 37 are the sprockets 38 with which is operatively engaged a chain 39 whereby said shafts are caused to rotate in unison and in the same direction.

Fixed to each of the shafts 37 within the forward portion 2 of the housing H and substantially bridging the space between the side walls 36 thereof, is a braking drum 40 including the outstanding teeth or fingers 41. The drum 40 and the teeth 41 coact with the upstanding pins or fingers 42 carried by the portion of the floor 9 comprised in the forward portion 2 of the housing H and underlying the shafts 37. By this means the harvested or gathered cotton after being delivered within the forward portion 2 of the housing is caused to move rearwardly thereof and at the same time is threshed or crushed so that the cotton and bolls together with other foreign matter may be effectively separated.

As disclosed in the accompanying drawings, the shafts 37 are three in number and the inner shaft 37 has its end portion opposite to the sprocket 38 extended and to which extended portion is fixed a second sprocket 43. Engaged with the sprocket 43 is a chain 44 also operatively engaged with a relatively large sprocket 45 rotating with the adjacent supporting wheel 12 whereby the shafts 37 are caused to revolve as the machine advances. The forward shaft 37 has its end portion remote from its sprocket 38 also extending exteriorly of the housing H and carried by said extended portion is a pulley 46 around which passes a crossed belt 47 or the like also operatively engaged with a pulley 48 fixed to the adjacent end portion of the shaft 34 whereby the conveyers 33 are caused to properly travel.

The floor 9 inwardly of the rear shaft 37 in the forward part of the rear portion 1 of the housing H, is provided with a transversely disposed elongated opening 50 which constitutes a discharge opening for the separated bolls and other foreign matter.

Rotatably supported by the floor 9 and extending transversely thereof is a shaft 51. The shaft 51 is positioned within the opening 50 adjacent the forward edge thereof. Extending around said shaft is an endless apron or carrier 52, preferably of canvas and which also is operatively engaged with a transversely disposed shaft 53 supported by the side walls 54 of the rear portion 1 of the housing H adjacent the top thereof and at a point rearwardly of the opening 50 so that said apron or carrier is disposed on an upward and rearward incline. The apron or carrier 52 is preferably of canvas and has disposed transversely thereof the spaced cleats 55. In practice the forward or upper stretch of the apron or carrier 52 travels upwardly and rearwardly and receives the crushed or threshed material after the same has passed beneath the drums 40.

The upper shaft 53 has one end portion extending exteriorly of the housing H and to said extended portion is fixed a pulley 56 around which is disposed a cross belt 57 or the like which is also operatively engaged with the pulley 56ª fixed to the extended portion of the transversely disposed shaft 58 also rotatably supported by the side walls 54 of the rear portion 1 of the housing H at a point in close proximity to the floor 9.

The walls 54 above the shaft 58 and rearwardly thereof also support a shaft 59 having an end portion extending exteriorly of the housing H and to said extended portion is fixed a pulley 60 operatively engaged by a belt 61 or the like with a pulley 62 also fixed to the extended portion of the shaft 58 whereby the shafts 58 and 59 are caused to rotate in unison and in the same general direction.

The shafts 58 and 59 within the housing H have fixed thereon the circular saws 63 which, upon rotation of the shafts 58 and 59 operate to effectively separate the cotton from the bolls. To prevent the bolls and other foreign matter from passing through with the separated cotton we provide the rods or ribs 64 extending forwardly and downwardly in advance of the shafts 58 and 59 in relatively close proximity to the saws 63 with the adjacent rods or ribs closely adjacent to each other. The rods or ribs 64 are of such length to extend above the upper shaft 59 and below the lower shaft 58 and the opposite end portions of such rods or ribs 64 are anchored to the transversely disposed cross members 65 and 66, the lower member 65 being supported upon the floor 9 adjacent the inner edge of the opening 50 and the upper member 66 supported by the side walls 54 adjacent to the top of the housing H.

The end portion of the shaft 59 remote from the pulley 61 also extends exteriorly of the housing H and said extended portion has fixed thereto a sprocket 67 around which passes a chain 68 also operatively engaged with the relatively large sprocket 69 movable with a second supporting wheel 12. As the cotton is separated by the saws 63, the bolls and other foreign matter will drop down along the rods or ribs 64 and be discharged upon the ground through the opening 50.

Rotatably supported by the side walls 54 of the portion 1 of the housing H and rearwardly of the shaft 59 at a point substantially midway the height of said portion 1 is a transversely disposed shaft 70, one end portion of which extending exteriorly of the housing H. Said extended portion of the shaft 70 has fixed thereto a pulley 71 around which passes a crossed belt 73 or the like which is also operatively engaged with the pulley 74 fixed to the extended portion of the shaft 59 adjacent the pulley 60.

Fixed to the portion of the shaft 70 within the housing H are the fan blades 75. The shaft 70 rotates in a direction whereby the fan blades 75 operate to blow the separated cotton out through the chute 76. The chute 76 is in communication with the rear portion of the housing H at the lower part of the rear closed end 3 thereof and said shaft 76 is of such length to discharge the cotton within a barge or other vehicle following our improved machine and which barge may, if preferred, be coupled directly to our improved machine.

Extending forwardly of the housing H from the opposite sides thereof are the tongues 78 substantially in parallelism and the outer end portions of said tongues 78 are connected by the cross member 79. The opposite end portions of the cross member 79 have secured thereto the clevises 80 or the like to which are adapted to be engaged the neck yokes of the draft animals so that the tongues 78 operate to facilitate the desired travel of the machine.

The sill 16 is supported within the guide members 81 depending from the sides of the housing H at the forward end thereof. Operatively engaged with each end portion of the sill 16 is a vertically disposed rod 82. The rod 82 is freely disposed through an extended end portion of a beam 83 extending transversely over the housing H adjacent the front or open end thereof and secured thereto.

The upper end portions of the rods 82 are secured to a transversely disposed member 84. The central portion of the member 84 is operatively engaged with the lower angular portion 85 of a lever 86. The lever 86 is pivotally engaged as at 87 with an upstanding rack 88 carried by a transversely disposed beam 89 secured to and overlying the forward portion of the housing H. Carried by the lever 86 is a conventional type of latch mechanism 90 coacting with the rack 88. The lever 86 is disposed on a rearward and upward incline and terminates in such proximity to the seat structure 91 to permit the occupant thereof to manipulate the lever 86 as may be required. By swinging the lever 86 in the requisite direction, the forward portion of the machine may be raised or lowered depending upon the height of the cotton plants.

In the present embodiment of our invention, the seat structure 91 is positioned upon the forward part of the rear portion 1 of the housing H.

From the foregoing description it is thought to be obvious that a cotton harvester constructed in accordance with an embodiment of our invention is of an extremely simple and comparatively inexpensive nature, and is particularly well adapted for use by reason of the convenience and facility with which it may be assembled and operated, and it will also be obvious that our invention is susceptible of some change and modification without departing from the principles and spirit thereof, and for this reason we do not wish to be understood as limiting ourselves to the precise arrangement and formation of the several parts herein shown in carrying out our invention in practice, except as hereinafter claimed.

We claim:

1. A machine of the class described comprising a portable body, gathering means carried thereby and extending in advance thereof and delivering upon the forward end portion of the body, a plurality of upstanding fingers carried by the forward end portion of the body, a plurality of braking members carried by the body portion and co-operating with said upstanding fingers, said braking members being arranged so that the articles delivered to one of the braking members are delivered by the said braking member to the remaining braking members, and a separating mechanism carried by the body rearwardly of the braking members.

2. A machine of the class described comprising a portable body, gathering means carried thereby and extending in advance thereof and delivering upon the forward end portion of the body, a plurality of upstanding fingers carried by the forward end portion of the body, a plurality of braking members carried by the body portion and co-operating with said upstanding fingers, the said braking members being so arranged that the articles delivered to one of the braking members are delivered by the said braking member to the remaining braking members, means for rotating the braking members in the same direction, and a separating mechanism carried by the body rearwardly of the braking members.

3. A machine of the class described comprising a portable body, gathering means carried thereby and extending in advance thereof and delivering upon the forward end portion of the body, a plurality of upstanding fingers carried by the forward end of the body portion, a plurality of braking members carried by the body portion and co-operating with the upstanding fingers, the said braking members being so arranged that the articles delivered to one of the braking members are delivered by the said braking member to the remaining braking members, a sprocket on the end of each of the braking members, a chain passing around all of the said sprockets, means for rotating one of said sprockets and thereby transmitting rotary movement in the same direction to the other sprockets, and a separating mechanism carried by the body rearwardly of the braking members.

4. A machine of the class described comprising a portable body, gathering means carried thereby and extending in advance thereof and delivering upon the forward end portion of the body, a plurality of upstanding fingers carried by the forward end of the body portion, a plurality of transversely disposed braking members carried by the body portion and coöperating with the upstanding fingers, the braking members being so arranged that the articles delivered to one of the braking members are delivered to the remaining braking members, means for delivering the articles gathered to each of the braking members, a plurality of separating mechanisms rearwardly of the braking members and arranged in different horizontal planes, transversely spaced, rearwardly and upwardly inclined rods positioned in advance of the separating means, a discharge opening, and an endless conveyer for conveying the articles from the last of the braking members to the upper ends of the transversely spaced rods.

5. A machine of the class described comprising a portable body, gathering means carried thereby and extending in advance thereof and delivering upon the forward end portion of the body, upstanding fingers carried by the body, braking members coacting with said fingers, the braking members being so arranged that the articles delivered to one of the braking members are delivered to the remaining braking members, separating members rearwardly of the braking members, an endless carrier for conveying the articles to be separated from the braking members to the separating members, and means connecting the endless carrier with the separating means whereby they are driven in opposite directions.

6. A machine of the class described comprising a portable body, gathering means carried thereby and extending in advance thereof and delivering upon the forward end of the body, upstanding fingers carried by the body, braking members coacting with the upstanding fingers, the braking members being so arranged that the articles delivered to one of the braking members are delivered to the remaining braking members, separating means rearwardly of the braking members, an endless carrier conveying the articles from the braking members to the separating means, means for discharging certain of the material separated by the separating means, and means connecting the endless carrier, the separating means and the discharging means whereby the said means are driven in a predetermined timed relation to each other.

In testimony whereof we hereunto affix our signatures.

WILLIAM F. LOCKWOOD.
BERLIE H. SCOTT.
WILLIAM G. ROYAL.